United States Patent [19]

Komatsu

[11] Patent Number: 4,909,689
[45] Date of Patent: Mar. 20, 1990

[54] DOUBLE LOCKNUT ASSEMBLY

[75] Inventor: Minoru Komatsu, Tokyo, Japan

[73] Assignee: Noboru Sado, Kanagawa, Japan

[21] Appl. No.: 343,828

[22] Filed: Apr. 27, 1989

Related U.S. Application Data

[63] Continuation of Ser. No. 21,988, Mar. 5, 1987, abandoned.

[51] Int. Cl.$^4$ .............................................. F16B 39/12
[52] U.S. Cl. .................................. 411/237; 411/222; 411/432
[58] Field of Search ............... 411/222, 237, 238, 239, 411/432, 433

[56]    References Cited
U.S. PATENT DOCUMENTS

| 898,432 | 9/1908 | Boyle | 411/237 |
| 1,405,342 | 1/1922 | Shaffer | 411/433 |
| 1,607,873 | 11/1926 | Crowder | 411/433 |
| 1,806,506 | 5/1931 | Savidge | 411/237 |
| 2,384,953 | 9/1945 | Miller | 411/237 |
| 2,784,637 | 3/1957 | Smisko | 411/432 |

FOREIGN PATENT DOCUMENTS

| 0079291 | 5/1983 | European Pat. Off. | 411/237 |
| 557303 | 5/1923 | France | 411/222 |
| 705674 | 3/1931 | France | 411/222 |
| 45-30843 | 10/1970 | Japan | 411/222 |
| 38399 | 11/1923 | Norway | 411/222 |
| 731110 | 4/1980 | U.S.S.R. | 411/222 |
| 156458 | 1/1921 | United Kingdom | 411/222 |
| 197324 | 4/1923 | United Kingdom | 411/222 |
| 858138 | 1/1961 | United Kingdom | 411/432 |
| 1204925 | 9/1970 | United Kingdom | 411/432 |

Primary Examiner—Gary L. Smith
Assistant Examiner—Suzanne L. Dino
Attorney, Agent, or Firm—Edmund M. Jaskiewicz

[57]    ABSTRACT

Provided is a double locknut assembly composed of a first nut and a second nut for fastening the first nut onto a bolt, wherein the above-mentioned first nut is formed therein with a bolt hole formed therein with a female screw thread threaded to engage with the screw thread of the bolt, the first nut having a projecting part, the outer peripheral surface of the projecting part having a truncated-conical surface on which a male screw thread is formed, the first nut being formed therein a slit so that the first nut is diametrically contractible, and the second nut is formed in the center section thereof with a bore having a truncated-conical surface formed therein with a female screw thread threaded to engage with the male screw thread on the outer peripheral surface of the projecting part of the first nut, thereby after the second nut is engaged with the first nut to a slight degree to form a one body unit, the first nut is engaged with a bolt, and thereafter the second nut is tightened to cause the first nut to wedge into the bolt so as to obtain a locking function.

2 Claims, 4 Drawing Sheets

DOUBLE LOCKNUT ASSEMBLY

This is a continuation of application Ser. No. 021,988, filed Mar. 5, 1987, now abandoned.

BACKGROUND OF THE INVENTION

1. Field of the Invention

The present invention relates to a double locknut assembly provided with a locking function or a function to prevent it from becoming loose.

2. Prior Art

Heretofore, there has been known various kinds of double locknut assemblies provided with a locking function. However, there has been disadvantage in that locknuts having a satisfactory locking function are difficult to manufacture while locknuts which can be simply manufactured have an unsatisfactory locking function.

The present invention is devised in view of the above-mentioned problem inherent to prior art locknuts.

Accordingly, the main object of the present invention is to provide a double locknut assembly which can be simply manufactured and which has a satisfactory locking function.

Further objects and advantages thereof will be apparent from the following description of the invention.

SUMMARY OF THE INVENTION

According to the present invention there is provided a double locknut assembly composed of a first nut having a projecting part and a ring-like second nut for fastening the first nut onto a bolt. The above-mentioned first nut is composed of a flange section and a part projecting from the flange section. A bolt hole into which a bolt is inserted is formed by piercing the flange section and the projecting part at the center thereof, and formed therein with a female screw thread which is threaded to be engaged with a main thread on a bolt. The outer peripheral surface of the above-mentioned projecting part has a truncated-conical outer surface on which a male screw thread is formed. The above-mentioned first nut is formed therein with a slit such that it can be radially contracted. The second nut is formed in the center section thereof with a bore for receiving the projecting part of the first nut, having a truncated-conical inner surface formed therein with a female screw thread adapted to be engaged with the male screw thread on the outer peripheral surface of the projecting part.

DETAILED DESCRIPTION OF THE INVENTION

Figure 1:
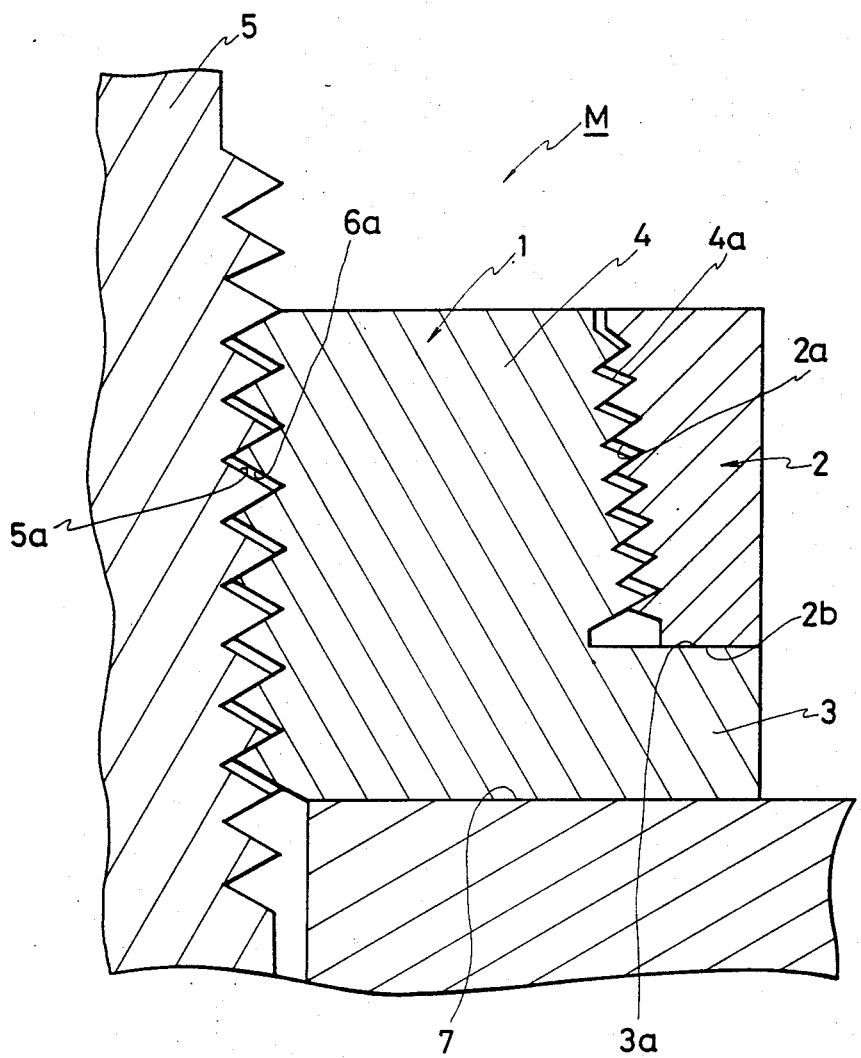
FIG. 1 is a cross-sectional view explaining the threadedly engaging condition of a first nut and a second nut.
Figure 2:
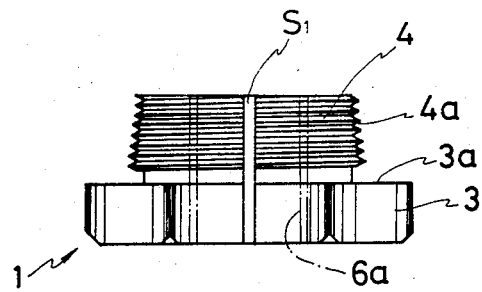
FIG. 2 is a front view of the first nut.
Figure 3:
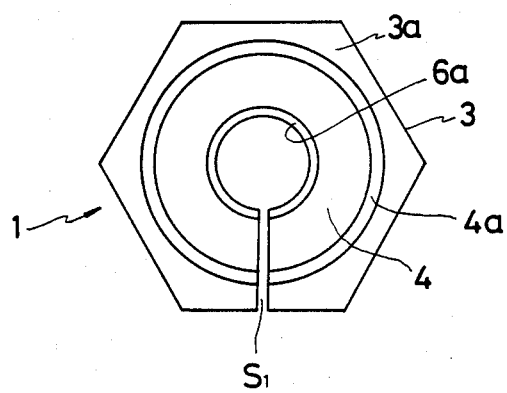
FIG. 3 is a plan view of the first nut.
Figure 4:
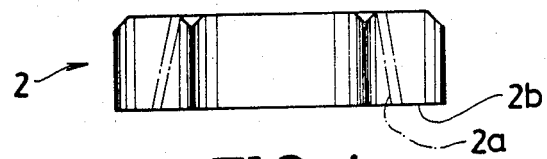
FIG. 4 is a front view of the second nut.
Figure 5:
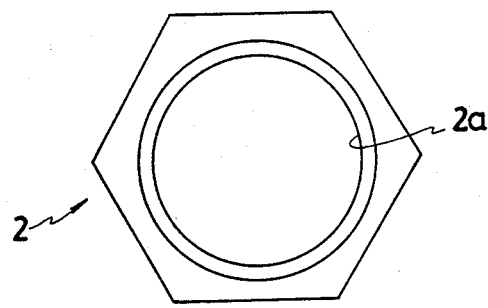
FIG. 5 is a plan view of the second nut.
Figure 6:
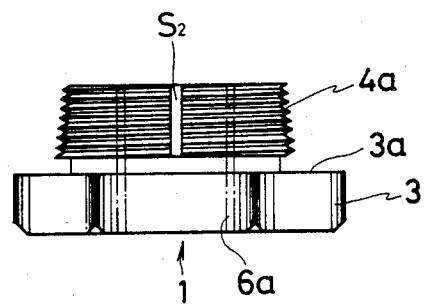
FIG. 6 is a plan view illustrating another embodiment form of the first nut.

The present invention will be explained in one embodiment form with reference to the accompanying drawings Referring to FIGS. 1 to 5, a double locknut assembly M according to the present invention is composed of a first nut having a projecting part 4 and a ring-like second nut 2. The first nut comprises a flange section 3 and a projecting part 4 projecting from the flange section 3. The first nut is formed in the center section thereof with a bolt hole through which a bolt 5 is adapted for insertion, and in which a female screw thread 6a threaded to engage with a male screw thread 5a on the bolt 5a is formed. The outer peripheral surface of the above-mentioned projecting part 4 has a truncated-conical outer surface on which a male screw thread 4a is formed The pitch of the male screw thread 4a is preferably less than that of the above-mentioned female screw thread 6a. Further, an axial slit S1 is formed in the first nut 1. Due to the provision of the slit S1, the diameter of the first nut 1 can be reduced when the first nut 1 is tightened by the second nut 2 so that the female screw thread 6a embraces the male screw thread 5a of the bolt 5.

The ring-like second nut 2 is formed in its center section with a bore having a truncated-conical inner surface, for receiving the projecting part 4 of the first nut 1, formed therein with a female screw thread 2a threaded to engage with the male screw thread 4a on the projecting part 4.

When this double locknut assembly M is fitted onto the bolt 5, after the second nut 2 is engaged through threads with the projecting part 4 of the first nut 1 by a slight degree to form one body unit, the first nut 1 is tightened on the bolt 5 until the first nut 1 sufficiently fastens the member 7 to be tightened. Thereafter, the second nut 2 is tightened. Then, the first nut 1 is squeezed by the second nut 2 in the direction in which the diameter of the first nut 1 is reduced, and therefore, the female screw thread 6a of the first nut 1 wedges into the male screw thread 5a of the bolt 5. Simultaneously, the bottom surface 2b of the second not 2 has strong frictional contact with the upper surface 3a of the flange section 3 of the first nut.

It is possible to select such a relationship that the inner diameter of the second nut is smaller than the outer diameter of the projecting part 4 in order to reduce the diameter of the first nut 1 by means of the second nut 2, or such that the degree of the taper of the hole of the second nut 2 is slightly larger than that of the taper of the projecting part 4 in order to squeeze the upper section alone of the projecting part 4.

It is to be noted here that although the male screw thread 4a on the outer peripheral surface of the first nut 1 and the female screw thread 2a in the second nut 2 have been explained as right-handed screw threads, respectively, these can be left-handed screw threads for squeezing the outer peripheral surface of the first nut 1 inward. Further, although it is illustrated that the above-mentioned slit S1 in the first nut 1 is formed to extend over the entire length of the first nut 1, a slit S2 can be formed instead of the slit S1 within the range of the projecting part 4. Further, not only one slit S2 but a plurality of slits S2 may also be formed at suitable intervals. In the practice of this invention, it is preferred that three or four slits S2 be formed in the first nut 1.

Figure 7:
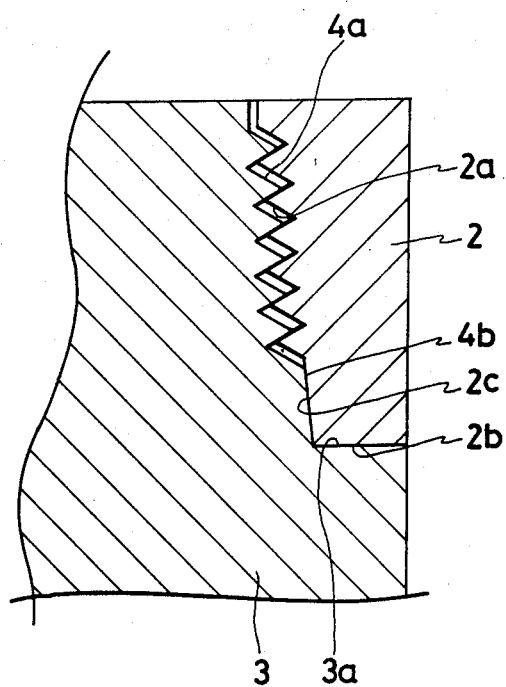
FIG. 7 is a cross-sectional view illustrating another embodiment form of the present invention.

Further, as shown in FIG. 7, it is possible to provide such an arrangement that thin screw threads 4a, 2a are formed on a projecting part 3 of the first nut 1 and in the second nut 2, respectively in a part of the entire height thereof while inclined surfaces 4b, 2c are formed on and in them in the remaining part thereof with a frictional force being effected there-between.

As explained above, according to the present invention, the double locknut assembly may have a satisfactory locking effect and be manufactured without difficulty.

While, the invention has been explained with reference to specific embodiment, it is to be noted that the description is illustrative and the invention is limited only by the appended claims.

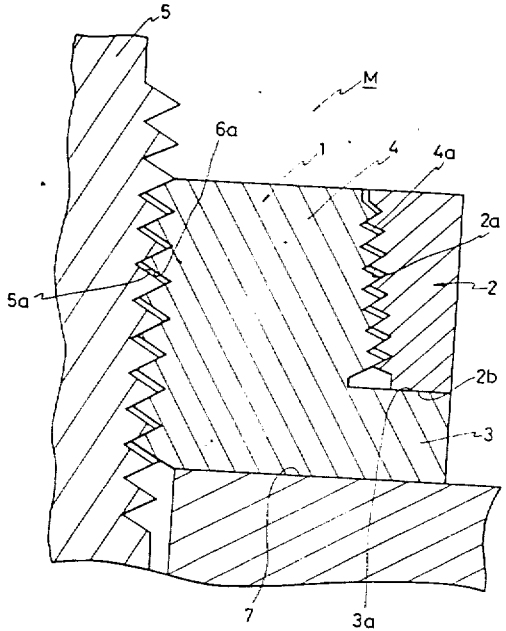

What is claimed is:

1. A double locknut assembly comprising a first nut including a flange section and a part projecting from said flange section, a bolt hole through which the bolt is inserted being formed to pierce the flange section and the projecting part, said bolt hole being formed therein with a female screw thread threaded to engage with the male screw thread of the bolt, the outer peripheral surface of said projecting part having a truncated-conical surface along the entire length of which a male screw thread is formed, and said first nut being formed therein with at least one axial slit so that said first nut is diametrically contractible, and a second nut for fastening said first nut onto a bolt; said second nut being formed in the center section thereof with a bore threaded to engage with said projecting part of said first nut, said bore having along its entire length a truncated-conical surface along the entire length of which is a female thread which is threaded to engage only with said male screw thread on the outer peripheral surface of the first nut, said male screw thread on the outer peripheral surface of said first nut having a pitch less than that of the female screw thread of said bolt hole, the degree of taper of said bore of said second nut being greater than that of the taper of said projecting part of said first nut, the diameter of said bore of the second nut is smaller than the outer diameter of said projecting part of the first nut.

2. A double locknut assembly as set forth in claim 1 wherein a plurality of slits are formed in the range of said projecting part of said first nut.

* * * * *

UNITED STATES PATENT AND TRADEMARK OFFICE
CERTIFICATE OF CORRECTION

PATENT NO. : 4,909,689

DATED : March 20, 1990

INVENTOR(S) : Minoru Komatsu

It is certified that error appears in the above-identified patent and that said Letters Patent is hereby corrected as shown below:

The title page should be deleted to appear as per attached title page.

Signed and Sealed this

Fourth Day of September, 1990

Attest:

HARRY F. MANBECK, JR.

*Attesting Officer*   *Commissioner of Patents and Trademarks*

United States Patent [19]

Komatsu

[11] Patent Number: 4,909,689
[45] Date of Patent: Mar. 20, 1990

[54] DOUBLE LOCKNUT ASSEMBLY

[75] Inventor: Minoru Komatsu, Tokyo, Japan

[73] Assignee: Noboru Sado, Kanagawa, Japan

[21] Appl. No.: 343,828

[22] Filed: Apr. 27, 1989

Related U.S. Application Data

[63] Continuation of Ser. No. 21,988, Mar. 5, 1987, abandoned.

[51] Int. Cl.⁴ ............................................. F16B 39/12
[52] U.S. Cl. ................................. 411/237; 411/222; 411/432
[58] Field of Search ............... 411/222, 237, 238, 239, 411/432, 433

[56] References Cited

U.S. PATENT DOCUMENTS

| | | | |
|---|---|---|---|
| 898,432 | 9/1908 | Boyle | 411/237 |
| 1,405,342 | 1/1922 | Shaffer | 411/433 |
| 1,607,873 | 11/1926 | Crowder | 411/433 |
| 1,806,506 | 5/1931 | Savidge | 411/237 |
| 2,384,953 | 9/1945 | Miller | 411/237 |
| 2,784,637 | 3/1957 | Smisko | 411/432 |

FOREIGN PATENT DOCUMENTS

| | | | |
|---|---|---|---|
| 0079291 | 5/1983 | European Pat. Off. | 411/237 |
| 557303 | 5/1923 | France | 411/222 |
| 705674 | 3/1931 | France | 411/222 |
| 45-30843 | 10/1970 | Japan | 411/222 |
| 38399 | 11/1923 | Norway | 411/222 |
| 731110 | 4/1980 | U.S.S.R. | 411/222 |
| 156458 | 1/1921 | United Kingdom | 411/222 |
| 197324 | 4/1923 | United Kingdom | 411/222 |
| 858138 | 1/1961 | United Kingdom | 411/432 |
| 1204925 | 9/1970 | United Kingdom | 411/432 |

Primary Examiner—Gary L. Smith
Assistant Examiner—Suzanne L. Dino
Attorney, Agent, or Firm—Edmund M. Jaskiewicz

[57] ABSTRACT

Provided is a double locknut assembly composed of a first nut and a second nut for fastening the first nut onto a bolt, wherein the above-mentioned first nut is formed therein with a bolt hole formed therein with a female screw thread threaded to engage with the screw thread of the bolt, the first nut having a projecting part, the outer peripheral surface of the projecting part having a truncated-conical surface on which a male screw thread is formed, the first nut being formed therein a slit so that the first nut is diametrically contractible, and the second nut is formed in the center section thereof with a bore having a truncated-conical surface formed therein with a female screw thread threaded to engage with the male screw thread on the outer peripheral surface of the projecting part of the first nut, thereby after the second nut is engaged with the first nut to a slight degree to form a one body unit, the first nut is engaged with a bolt, and thereafter the second nut is tightened to cause the first nut to wedge into the bolt so as to obtain a locking function.

2 Claims, 4 Drawing Sheets